(12) United States Patent
Liu

(10) Patent No.: US 7,508,116 B2
(45) Date of Patent: Mar. 24, 2009

(54) METHOD AND APPARATUS FOR VIBRATION MACHINING WITH TWO INDEPENDENT AXES

(75) Inventor: Xinbing Liu, Cambridge, MA (US)

(73) Assignee: Panasonic Corporation, Osaka (JP)

(*) Notice: Subject to any disclaimer, the term of this patent is extended or adjusted under 35 U.S.C. 154(b) by 566 days.

(21) Appl. No.: 11/221,041

(22) Filed: Sep. 7, 2005

(65) Prior Publication Data
US 2007/0052326 A1    Mar. 8, 2007

(51) Int. Cl.
*H01L 41/08*    (2006.01)
(52) U.S. Cl. ............................ 310/328; 310/317
(58) Field of Classification Search ........... 310/323.01, 310/323.12, 323.16, 323.18, 328
See application file for complete search history.

(56) References Cited

U.S. PATENT DOCUMENTS

| | | | |
|---|---|---|---|
| 4,620,121 A * | 10/1986 | Mishiro | 310/323.18 |
| 5,165,205 A | 11/1992 | Nakagawa et al. | |
| 6,637,303 B2 | 10/2003 | Moriwaki et al. | |
| 6,715,336 B1 * | 4/2004 | Xu | 73/7 |
| 6,995,498 B2 * | 2/2006 | Wallaschek et al. | 310/323.18 |
| 2002/0104963 A1 * | 8/2002 | Mancevski | 250/306 |
| 2002/0152851 A1 | 10/2002 | Moriwaki et al. | |
| 2004/0077293 A1 | 4/2004 | Kostar et al. | |
| 2006/0138897 A1 * | 6/2006 | Hess | 310/311 |
| 2007/0247589 A1 * | 10/2007 | Schorcht et al. | 351/178 |

FOREIGN PATENT DOCUMENTS

| | | |
|---|---|---|
| EP | 0 979 700 | 2/2000 |
| EP | 0 979 700 A2 | 2/2000 |

OTHER PUBLICATIONS

European Search Report for EP 06 11 9431, completed Jan. 17, 2008.
J. Kumabe, K. Fuchizawa, T. Soutome and Y. Nishimoto; *Ultrasonic Superposition Vibration Cutting of Ceramics*; Precision Engineering Apr. 1989; vol. 11, No. 2; XP008087370; Butterworth & Co. (Publishers) Ltd.
Communication pursuant to Article 94(3) EPC dated Sep. 1, 2008.
Extended Search Report dated Jan. 25, 2008.

(Continued)

*Primary Examiner*—Mark Budd
(74) *Attorney, Agent, or Firm*—RatnerPrestia

(57) ABSTRACT

A vibration machining apparatus and method of use. The vibration machining apparatus includes a cutting tool and a motion stage coupled to one of the cutting tool or the workpiece to move the cutting tool relative to the workpiece. A tangent to a machine path and a normal to the surface of the workpiece define a vibration plane. The vibration machining apparatus further includes a first vibrating unit coupled to one of the cutting tool or the workpiece to vibrate it along a first vibrational direction, substantially in the vibration plane, and a second vibrating unit coupled with one of the cutting tool or the workpiece to vibrate the one of the cutting tool or the workpiece coupled to the second vibrating unit along a second vibrational direction, different from the first direction and substantially in the vibration plane.

24 Claims, 14 Drawing Sheets

OTHER PUBLICATIONS

Nobuhiko Negishi et al., "High Speed Vibration Assisted Maching," pp. 157-174.
Nobuhiko Negishi et al., "Elliptical Vibration Assisted Diamond Turning."
Thomas A Dow, et al., Vibration Assisted Diamond Turning Using Elliptical Tool Motion.
Nobuhiko Negishi et al., "Rapid Diamond Milling," pp. 129-140.
Thomas A Dow et al., Elliptical Vibration Assisted Diamond Turning.

* cited by examiner

COMBINED XY MOTION
TRAJECTORY OF CUTTING TOOL

METHOD AND APPARATUS FOR VIBRATION MACHINING WITH TWO INDEPENDENT AXES

FIELD OF THE INVENTION

The invention relates to vibration machining, and, more particularly, to a method and apparatus for machining a work piece using two independently coupled vibrating units.

BACKGROUND OF THE INVENTION

Vibration assisted machining (VAM), has recently been developed. This machining method enables machining of material, such as for example, silicon carbide that previously could not be single point diamond turned due to excessive heating of the diamond tip. VAM systems, such as the Ultramill system developed at North Carolina State University, use two piezoelectric (PZT) actuators mounted sided by side to drive a diamond tool in an elliptic trajectory. The minor and major axes of the ellipse trajectory are determined by a T-shaped linkage geometry of the PZT actuators to the diamond used for machining. However, this linkage geometry does not allow for reduced tool lead-in and lead-out zones (i.e., transition zones) when entering or exiting a workpiece.

The present invention provides an improved vibration milling apparatus and method for machining hard material to produce high quality surface finishes and may provide for reduced tool lead-in and lead-out zones.

SUMMARY OF THE INVENTION

A vibration machining apparatus configured for use in machining a surface of a workpiece is provided. The vibration machining apparatus includes: a cutting tool to machine at least a portion of the workpiece; a motion stage coupled to either the cutting tool or the workpiece; and two vibrating units, each coupled to either the cutting tool or the workpiece. The motion stage moves the cutting tool relative to the workpiece such that the cutting tool follows a machining path on the surface of the workpiece. The tangent of the machining path and the normal to the surface of the workpiece define a vibration plane. The first vibrating unit vibrates the one of the cutting tool or the workpiece it is coupled to along a first vibrational direction. This first vibrational direction is aligned substantially in the vibration plane. The second vibrating unit vibrates the one of the cutting tool or the workpiece it is coupled to along a second vibrational direction, which is also substantially aligned in the vibration plane, but is different from the first vibrational direction.

The present invention is further embodied in a method of machining a workpiece using the vibration machining apparatus. The cutting tool is moved relative to the workpiece such that the cutting tool follows a machining path on a surface of the workpiece. The tangent of the machining path and the normal to the surface of the workpiece define a vibration plane. Whichever one of the cutting tool or the workpiece is coupled to a first vibrating unit, is vibrated along a first vibrational direction, which is substantially in the vibration plane, and whichever one of the cutting tool or the workpiece is coupled to a second vibrating unit is vibrated along a second vibrational direction, which is also substantially in the vibration plane, but is different from the first vibrational direction.

BRIEF DESCRIPTION OF THE DRAWINGS

The invention is best understood from the following detailed description when read in connection with the accompanying drawings. It is emphasized that, according to common practice, the various features of the drawings may not be drawn to skill. On the contrary, the dimensions of the various features may be arbitrarily expanded or reduced for clarity. Moreover in the drawings, common numerical references are used to represent like features. Included in the drawings are the following figures.

DETAILED DESCRIPTION OF THE INVENTION

Figure 1:
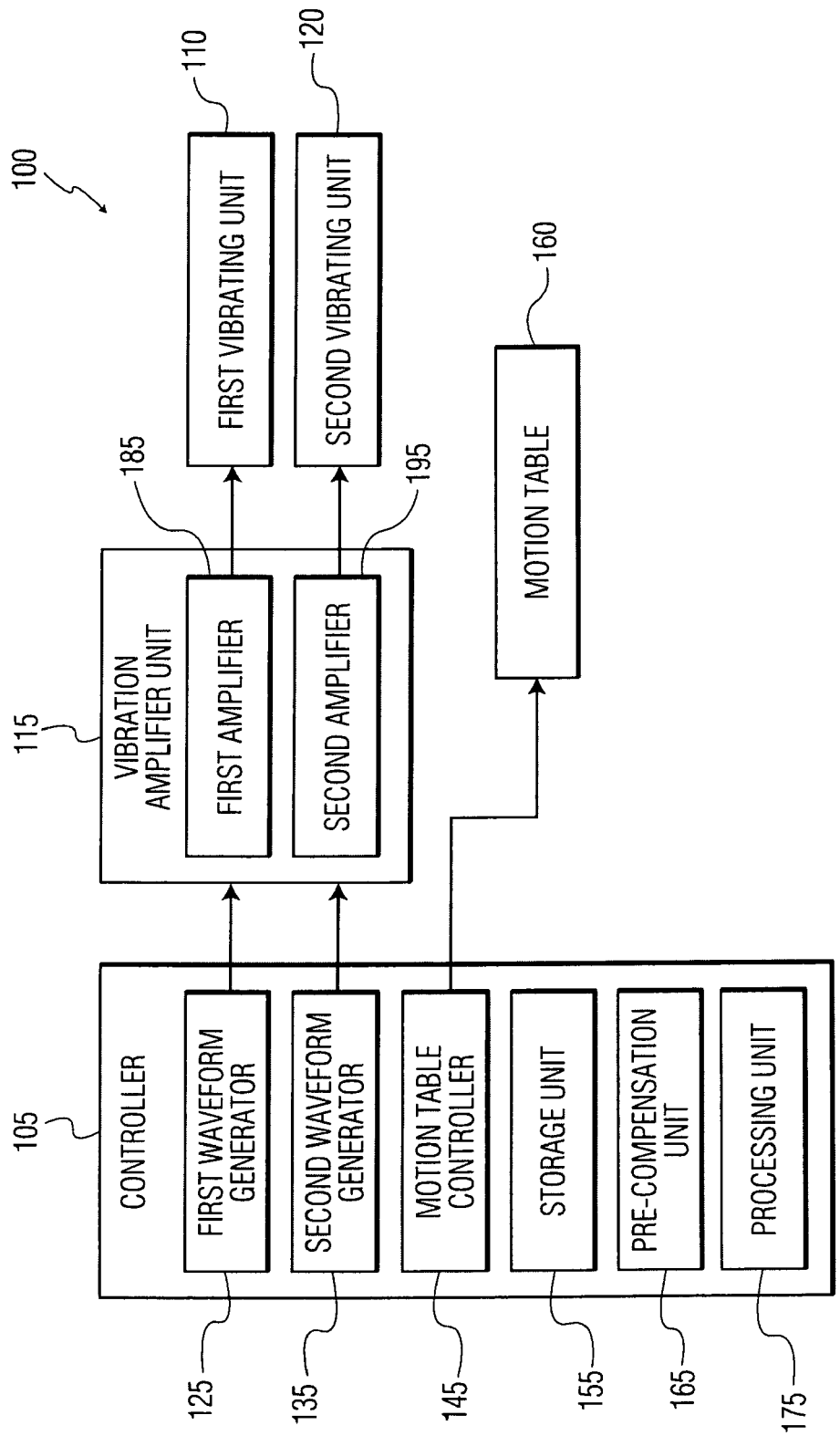
FIG. 1 is a functional block diagram illustrating a vibration machining apparatus usable with any one of the exemplary embodiments of the present invention.

An exemplary embodiment of the present invention is a vibration machining apparatus with two independently coupled vibrating units. In this exemplary embodiment, an elliptical motion of a cutting tool relative to the workpiece may be realized by the use of two independent vibrating units. A number of different configurations of the two independent vibrating units may be possible because only relative elliptical motion is desired. That is, for example, the cutting tool may be vibrated along one axis, while the workpiece may be vibrated along a second, orthogonal or substantially orthogonal axis. Moreover, since the motion along each axis may be decoupled, the motion along each axis may be varied independently, allowing easily controlled variation of the elliptical motion.

By decoupling the motion of the cutting tool relative to the workpiece along the different axes, non-elliptical trajectories may also be realized. It may be advantageous to realize these non-elliptical trajectories for machining, for example, lead-in and lead-out areas of the workpiece to produce reduced transition zones. Such reduced lead-in and lead-out transition zones may be used in producing, for example, improved optical gray scale gratings, micro-machined devices, micro electrical mechanical systems (MEMS), and other optical or non-optical devices with high quality surface finish tolerances. Surface finish tolerances, for example, in the range of about 5 nm to 100 nm, i.e. about 10 times as smooth as conventional diamond milling techniques, may be produce using exemplary vibration machining apparatus of the present invention.

For expediency, the exemplary machining of a mold of a gray scale grating is described. However, it is contemplated that the vibration machining apparatus may be used to machine a number of other structures. For example, the vibration machining apparatus, in accordance with exemplary embodiments of the present invention, may machine larger structures such as pistons and other metal and plastic structures, molds for injection molding, optical devices such as microlens arrays, optical fiber coupling components, deflective/reflective/spiral lenses, mirror arrays, wave-beam guides, hybrid lens, elliptical or cylindrical mirrors, MEMS, and bio-sensors, among others, as well as molds and mold inserts. The area of a workpiece to be machined by the vibration machining apparatus is not limited by the VAM process, but may be limited by the maximum travel length of the motion table.

It is further contemplated that the vibration machining apparatus may be used to machine hard materials such as silicone carbide, tungsten, tungsten carbide and sapphire, etc. This is because, in various embodiments of the present invention, the cutting tool trajectory may be precisely controlled to control the duty cycle and heating of the cutting tool. Additionally, materials, such as steel, that are difficult to machine using diamond turning may be machined using various embodiments of the present invention.

FIG. 1 is a functional block diagram illustrating an exemplary vibration machining apparatus that may be usable with any one of the exemplary embodiments of the present invention, and generally refers to the various embodiments disclosed herein.

Figure 2:
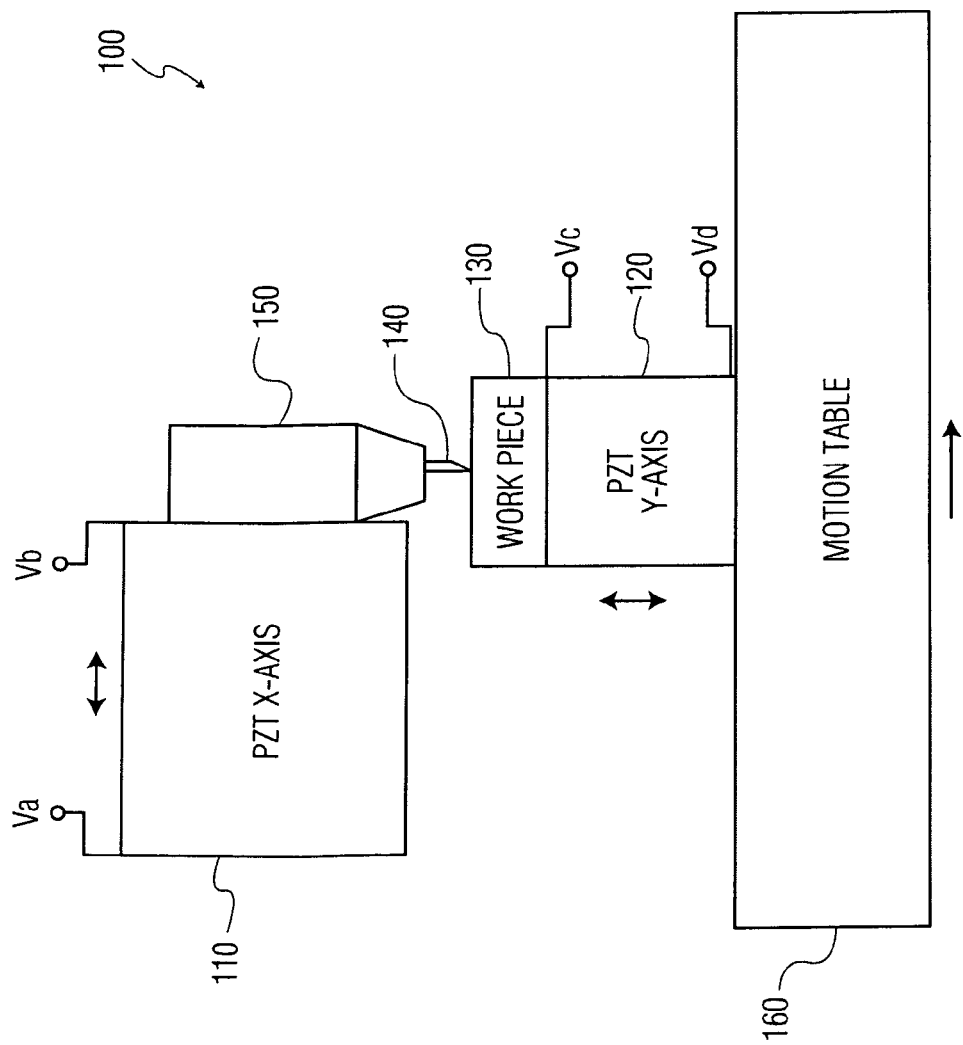
FIG. 2 is a schematic diagram illustrating a vibration machining apparatus according the an exemplary embodiment of the present invention.

FIG. 2 is a schematic diagram illustrating a vibration machine apparatus according an exemplary embodiment of the present invention.

Referring now to FIGS. 1 and 2, vibration machining apparatus 100 may be configured to machine a workpiece 130 using a cutting tool 140 and may include a controller 105, a vibration amplifier unit 115, a first vibrating unit 110, a second vibrating unit 120, a cutter holding unit 150 and a motion table 160. Controller 105 may control the operation of vibration machining apparatus 100 by providing control signals, control waveforms and/or control data to various other components of vibration machining apparatus 100. It is noted that vibration amplifier unit 115 may be omitted if the drive signals generated by controller 105 are sufficient to drive vibrating units 110 and 120. Additionally, it is noted that the amplifiers of vibration amplifier unit 115 may be integrally packaged with the vibrating units, rather than separated from the vibrating units as shown in FIG. 1.

Controller 105 may include a general purpose computer programmed to perform the desired functions, special purpose circuitry, a digital signal processor, and/or one or more application specific integrated circuits (ASIC's). Controller 105 may be designed to include a number of functional units, as shown in FIG. 1. These functional units may include: (1) a first waveform generator 125 to provide control signals for vibration by first vibrating unit 110; (2) a second waveform generator 135 to provide control signals for vibration by second vibrating unit 120; and (3) a motion table controller 145 to control movement of motion table 160 via a motor drive (not shown) such as a stepper motor or a linear induction motor. Controller 105 may include further functional units, such as a storage unit 155 to store information to machine a workpiece according to predetermined machining criteria (e.g., data representing machining parameters for machining at least one portion of workpiece 130), a pre-compensation unit 165 to pre-compensate input waveforms of first vibrating unit 110 and second vibrating unit 120 to reduce or substantially eliminate hysteresis effects in cutting tool 140 due to, for example, non-linearity of the vibrating units 110 and 120 and a processing unit 175 to control first and second waveform generators 125 and 135 and motion table controller 145 according to the predetermined machining criteria stored in storage unit 155.

By providing separate input waveforms to first and second vibrating units 110 and 120 which compensate for hysteresis and other non-linear effects of the vibration actuators in these vibrating units, the quality of surfaces produced using vibration machining apparatus 100 may be improved. For example, an error function corresponding to hysteresis effects of the vibration actuators in vibrating units 110 and 120 may be provided as a feedback signal to first and second waveform generators 125 and 135, which may use this feedback signal to constantly adjust the input waveforms of first and second vibrating units 110 and 120 to reduce the effects of the hysteresis.

Vibration amplifier unit 115 may desirably include a first amplifier 185 to amplify the power (i.e., by increasing the voltage and/or current) of the output waveform from first waveform generator 125. The amplified first waveform may be used to drive first vibrating unit 110. Vibration amplifier unit 115 may also include a second amplifier 195 to amplify the power of the output waveform from second waveform generator 135 and the amplified second waveform may be used to second vibrating unit 120.

First and second vibrating units 110 and 120 may produce vibration in respective vibration actuators (not shown) of first and second vibrating units 110 and 120 to vibrate structures coupled to these vibration actuators. Vibrating unit 110 may include terminals Va and Vb configured to couple an input voltage signal across vibrating unit 110. Vibrating unit 120 may include terminals Vc and Vd to couple an input voltage signal across vibrating unit 120. The vibration actuators of vibrating units 110 and 120 may desirably be a piezoelectric vibrating unit (i.e., may include a piezoelectric stack), and may vibrate in accordance with the input signal across their respective terminals. That is, the frequency of the vibration of each vibration actuator is desirably equal to the frequency of the voltage signal across the terminals of the corresponding vibrating unit and the amplitude of the vibration is desirably proportional to the amplitude of the voltage signal across the corresponding terminals.

Vibrating unit 110 may be controlled (i.e., independent of vibrating unit 120) by controller 105 via first waveform generator 125 (and first amplifier 185, if included) and vibrating unit 120 also may be independently controlled by controller 105 via second waveform generator 135 (and second amplifier 195, if included). First and second waveform generators 125 and 135 may be configured to adjust: (1) amplitudes of input waveforms to vibrating units 110 and 120; (2) a relative phase of the input waveforms of vibrating units 110 and 120; and/or (3) the input waveform shapes of vibrating unit 110 and 120, respectively.

In the exemplary embodiment illustrated in FIG. 2, cutter holding unit 150 may be coupled to vibrating unit 110 such that cutting tool 140 may be vibrated by vibrating unit 110 in directions substantially parallel to a plane of motion table 160 (i.e., along a first vibrational axis) and, desirably, may be tangent to a machining path produced by the motion of motion table 160. Vibrating unit 120 may be coupled to motion table 160 at one end of vibrating unit 120. Workpiece 130 may be releasably coupled to vibrating unit 120 at an opposite end of vibrating unit 120 to allow workpiece 130 to be vibrated relative to cutting tool 140 during a machining process. Thus, in the exemplary embodiment of FIG. 2, vibrating unit 110 and vibrating unit 120 are not coupled together.

Motion table 160 may be moved in a direction shown by the adjacent arrow. Although motion table 160 is shown as having only one degree of movement, it is contemplated that any motion stage (i.e., table) may be used including one which has up to six degrees of motion, namely: (1) motion along the X axis; (2) motion along the Y axis; (3) motion along the Z axis; (4) rotation in the X-Y plane; (5) rotation in the X-Z plane; and (6) rotation in the Y-Z plane.

Vibrating unit 110 is vibrated by the vibration actuator in directions indicated by the arrows in FIG. 2 adjacent to vibrating unit 110 (e.g., in a direction substantially tangent to the motion of motion table 160), moving cutting tool 140 in a substantially horizontal direction. Workpiece 130 is vibrated by the vibration actuator of vibrating unit 120 in a direction shown by arrows adjacent to vibrating unit 120 (e.g., in a direction substantially orthogonal to the motion of motion table 160), moving work piece 130 in a substantially vertical direction. By coordinating the amplitudes, phases, and waveforms of the vibrations provided by vibrating units 110 and 120, the relative motion between cutting tool 140 and workpiece 130 may form an elliptical or other shaped cutting path. The cutting path formed by the composite vibration resulting from vibrating unit 110 and vibrating unit 120 may have an elliptical shape or another shape for motion of the cutting tool 140 relative to workpiece 130. When motion table 160 is still, this cutting path shape may desirably be a closed loop trajectory. However, in practice, since the motion table 160 is moving, the trajectory of the cutting tool 140 relative to workpiece 130 may still loop, but also moves along the surface of the workpiece. This is because, for example, during one duty cycle motion table 160 may be moved at least some portion of the length of the major axis or minor axis of the cutting trajectory.

Although it is shown in FIG. 2 that vibrating unit 110 produces vibration along a first vibration direction substantially tangent to the machining path and vibrating unit 120 produces vibration along a second vibration direction substantially orthogonal to the machining path, it is contemplated that vibrating unit 110 may produce vibration along any direction (i.e., a first direction) which is substantially in a vibration plane. The vibration plane is defined by the tangent to the machine path and a normal to the surface of workpiece 130. Moreover, vibrating unit 120 may produce vibration along any direction, different from the first direction that is substantially in the vibration plane. Substantially in the vibration plane refers to directions which may form a small angle of, for example, several degrees with the vibration plane.

Although it is shown in FIG. 2 that the first vibrational direction and second vibration direction may desirably be substantially orthogonal to each other, it is contemplated that the first vibrational direction and second vibration direction may be set such that these directions are not a common direction. Either of these exemplary configurations may produce an elliptical trajectory of cutting tool 140 relative to workpiece 130 when sinusoidal drive signals are used. As described below, other relative motions of cutting tool 140 and workpiece 130 may produce other desired cutting trajectories of cutting tool 140 relative to workpiece 130.

Vibrating unit 110 and/or vibrating unit 120, respectively, may be voice coils, linear displacement transducers or piezoelectric vibrating units. Such piezoelectric vibrating units may desirably include a plurality of piezo layers to produce a piezoelectric stack. In such an arrangement, expansion and contraction of the piezoelectric stack is proportional to both the voltage applied across the piezoelectric stack and a number/thickness of layers of the piezoelectric stack. Each of the piezoelectric stacks of vibrating unit 110 and vibrating unit 120 may be cooled by a coolant (not shown), preferably a liquid coolant, however in some applications air cooling using heat fins and/or a fan may be adequate.

Cutting tool 140 includes a cutting edge which may be formed of any number of different materials typically used for machining of surfaces (e.g., diamond, tungsten, tungsten carbide, ceramic, ruby, silicone carbide and sapphire, among others).

Vibrating units 110 and 120, desirably, may have a vibration stroke in a range of about 1 µm to about 100 µm for applications such as machining optical structures or micromachine structures. Although the stroke may be in the range of 1 µm to about 100 µm, an area of a workpiece to be machined need not be limited to such ranges and that the area is determined by the range of motion table 160.

A range of motion of vibration machining apparatus 100 along the minor axis of vibration may be in the range of about 1 µm to 20 µm. Further, a range of motion of vibration machining apparatus 100 along the major axis of vibration may be in the range of about 1 µm to 100 µm to produce a desired elliptical motion. That is, the ratio of these motions along the major and minor axes of vibration may be in the range of about 1:1 to 100:1.

For vibrating units 110 and/or 120 using piezoelectric stacks, it is contemplated that the maximum input power for each stack may be in the range of about 250 watts to the damage threshold (e.g., maximum power threshold) of the piezoelectric stack using a sinusoidal waveform having a peak voltage in the range of about 500-1000 volts. The input power for each piezoelectric stack may be individually controlled via first and second amplifiers 185 and 195 of vibration amplifier unit 115.

It may be desired for the input waveforms of the electrical signal supplied to vibrating units 110 and 120 to have a phase angle of 90°. However, it is contemplated that other phase angles are possible, although phase angles of 0° and 180° may undesirably produce linear vibrating motions.

It may be desirable for the waveforms of the driving signals of vibrating units 110 and 120 to have respective directions of vibration which are in or substantially in a vibration plane defined by the tangent to the machining path and the normal to the surface of workpiece 130. However, other directions are possible as long as the respective vibration directions are not the same direction. Moreover, it may be desirable for the vibration direction of the vibrating unit 110 to be in the same or substantially the same direction as the tangent to the machining path.

The operating frequency of the vibrating unit 110 and vibrating unit 120 may be in a range of about 100 Hz to 50 KHz for the various exemplary embodiments. The operating frequency of the vibrating units may be limited by the resonance frequency based on the respective masses being moved and the elasticities of the components coupled to these moving masses. Different orientations may be desirable based on the relative masses of the various components because higher operating frequencies may be achievable with a particular orientation. It is noted that, by lowering the amount of mass moved by any one vibrating unit 110 or 120, a higher operating frequency may be realized.

FIGS. 3-7 are schematic diagrams illustrating alternative exemplary vibration machining apparatus 300, 400, 500, 600 and 700 according to exemplary embodiments of the present invention.

For brevity, with regard to FIGS. 3-7, the structure and operation of vibrating units 110 and 120, cutting tool 140 and motion table 160 may be only briefly described, since they are substantially identical to those of FIG. 2. Exemplary vibration machining apparatus 300, 400, 500, 600 and 700, illustrated in FIGS. 3-7, vary from exemplary vibration machining apparatus 100, illustrated in FIGS. 1 and 2, by the various orientations of the components.

Figure 3:
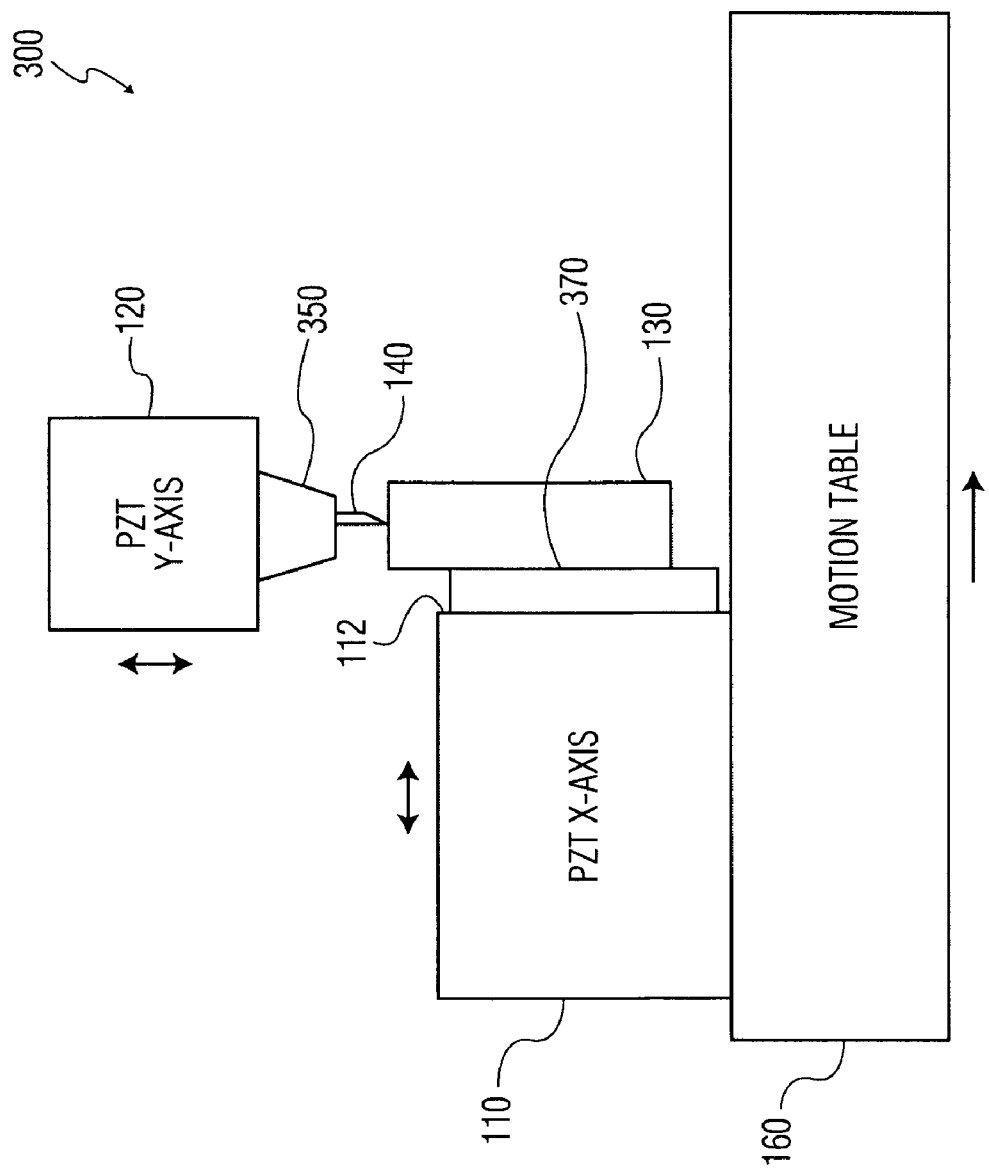
FIG. 3 is a schematic diagram illustrating a vibration machining apparatus according to another exemplary embodiment of the present invention.

Referring now to FIG. 3, vibration machining apparatus 300 illustrates a different orientation of components than that illustrated in FIG. 2. In this orientation, cutter holding unit 350 may be coupled to vibrating unit 120 and cutting tool 140 may be releasably coupled to cutter holding unit 350 while vibrating unit 120 vibrates cutter holding unit 350 and cutting tool 140 in a direction substantially orthogonal to the plane of motion table 160.

Work piece 130 may be releasably coupled via coupling member 370 at one end 112 of vibrating unit 110, and may be vibrated by vibrating unit 110 in a direction substantially parallel to the plane of motion table 160 during the machining process.

Figure 4:
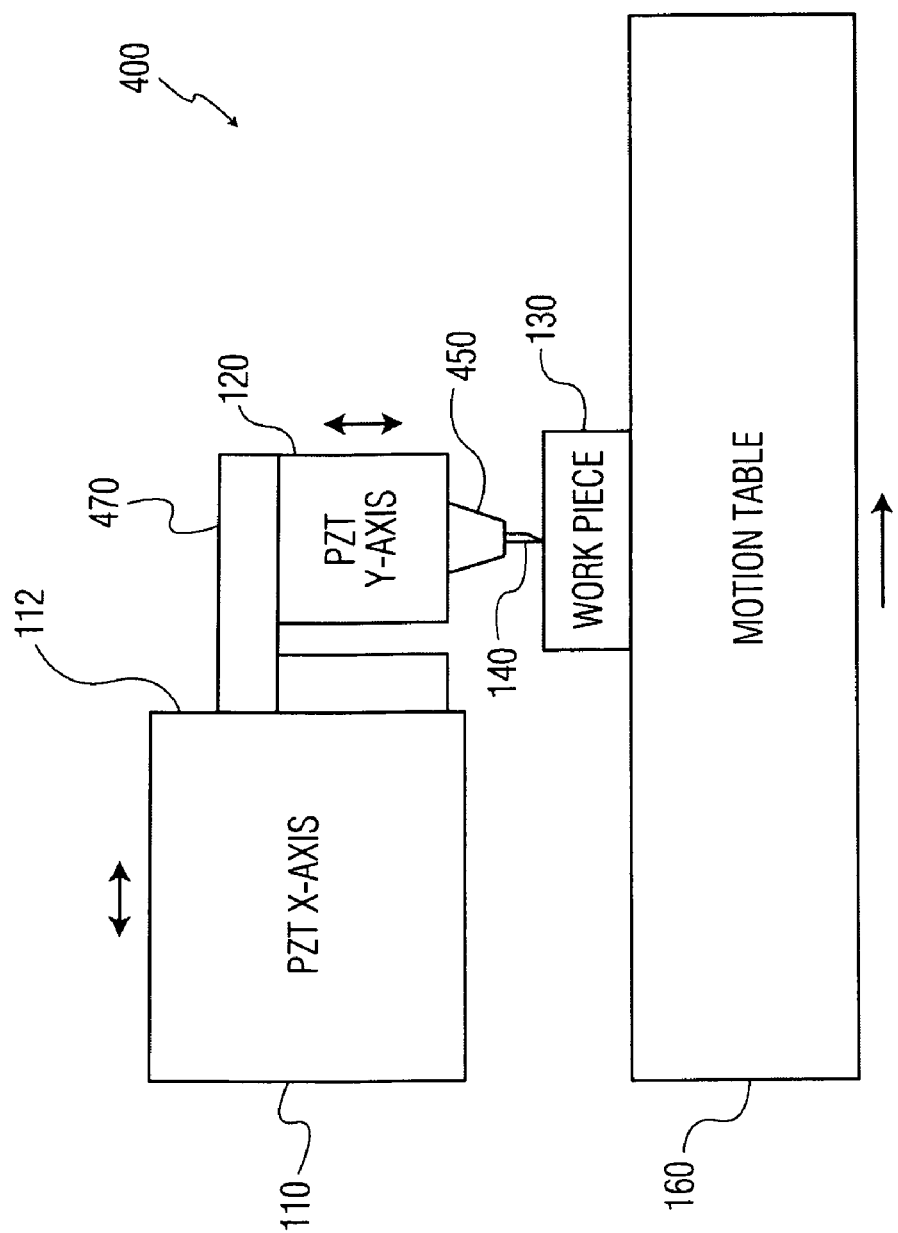
FIG. 4 is a schematic diagram illustrating a vibration machining apparatus according to yet another exemplary embodiment of the present invention.

Referring now to FIG. 4, exemplary vibration machining apparatus 400 may be used to machine workpiece 130 using cutting tool 140. Vibration machining apparatus 400 may include a controller (not shown), vibrating unit 110, vibrating unit 120, a cutter holding unit 450, a coupling member 470 and motion table 160.

In this exemplary embodiment, vibrating unit 120 is coupled to one end 112 of vibrating unit 110 via coupling member 470. Cutter holding unit 450 is coupled to vibrating unit 120 such that cutting tool 140, which is releasably coupled to cutter holding unit 450, may be vibrated, independently, by vibrating unit 120 in a direction substantially orthogonal to a plane of motion table 160 or by vibrating unit 110 in a direction substantially parallel to the plane of motion table 160, or in combination by vibrating units 110 and 120 in a substantially closed loop motion according to the selection of periodic input waveforms input to vibrating units 110 and 120. That is, vibrating unit 110 and vibrating unit 120 may be coupled to cutting tool 140 to allow vibrational machining of workpiece 130, which is releasably coupled to motion table 160.

For vibration machining apparatus 400, the operating frequency of the vibration machining apparatus may be limited by the resonance frequency of vibrating unit 110. This configuration may be desirable, for example, when the mass of workpiece 130 is relatively larger than the masses of the vibration actuator of vibrating unit 110, coupling member 470, vibrating unit 120, cutter holding unit 450 and cutting tool 140 so that the operation frequency may be increased.

Figure 5:
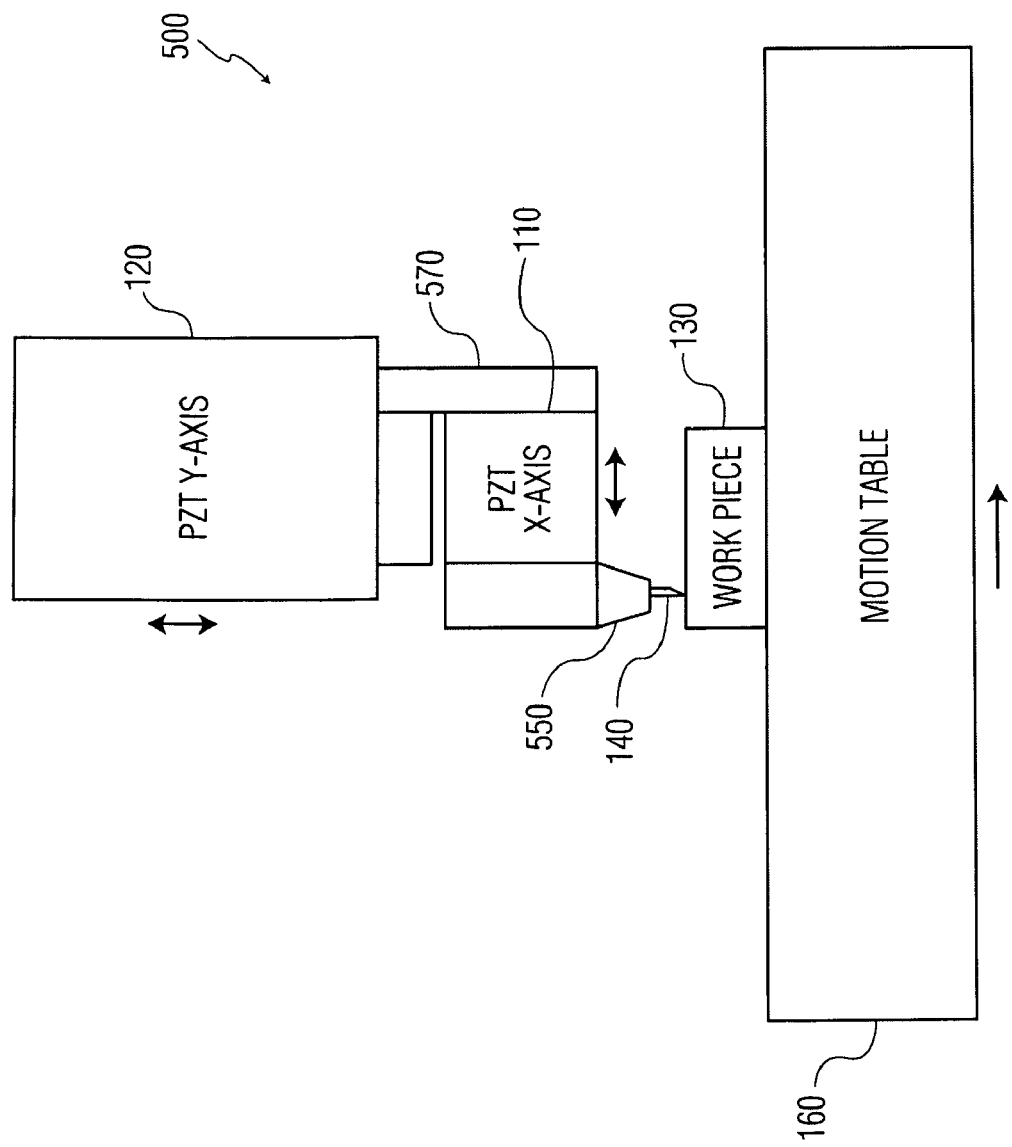
FIG. 5 is a schematic diagram illustrating a vibration machining apparatus according to yet another exemplary embodiment of the present invention.

Referring now to FIG. 5, exemplary vibration machining apparatus 500 used to machine workpiece 130 may include a controller (not shown), vibrating unit 110, vibrating unit 120, a cutter holding unit 550, a coupling member 570 and motion table 160.

Vibrating unit 110 may be coupled to one end of vibrating unit 120 via coupling member 570. Exemplary vibration machining apparatus 500 is similar to exemplary vibration machining apparatus 400, except that the order of vibrating units 110 and 120 has been reversed.

Figure 6:
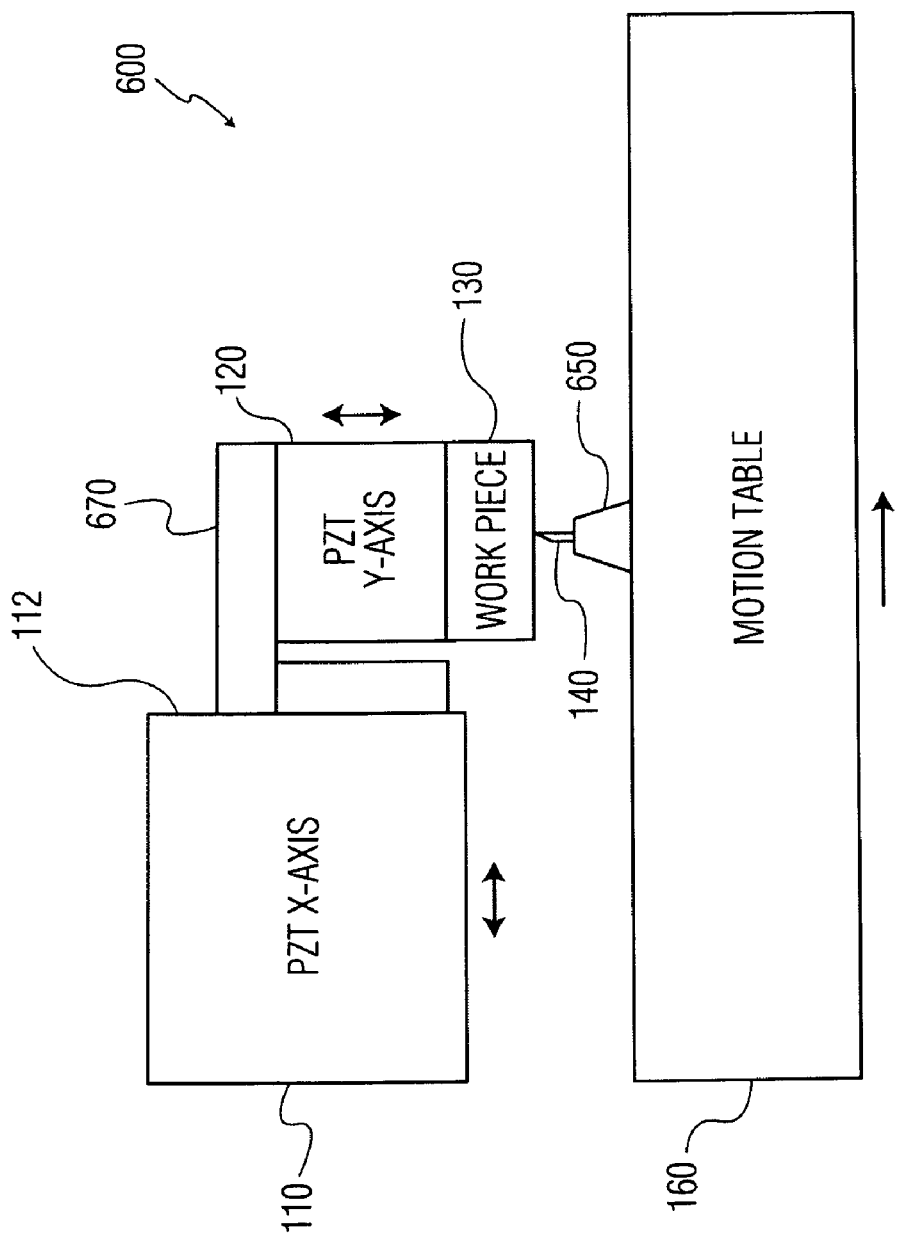
FIG. 6 is a schematic diagram illustrating a vibration machining apparatus according to yet another exemplary embodiment of the present invention.

Referring now to FIG. 6, exemplary vibration machining apparatus 600 used to machine workpiece 130 may include a controller (not shown), vibrating unit 110, vibrating unit 120, a cutter holding unit 650, a coupling member 670 and motion table 160. Exemplary vibration machining apparatus 600 is similar to exemplary vibration machining apparatus 400, except that the positions of workpiece 130 and cutting tool 140 have been reversed. Thus, in the exemplary embodiment of FIG. 6, workpiece 130 is vibrated instead of cutting tool 140. Cutter holding unit 650, in which cutting tool 140 is held, is coupled to motion table 160 to be drawn across the surface of workpiece 130 during the machining process.

Figure 7:
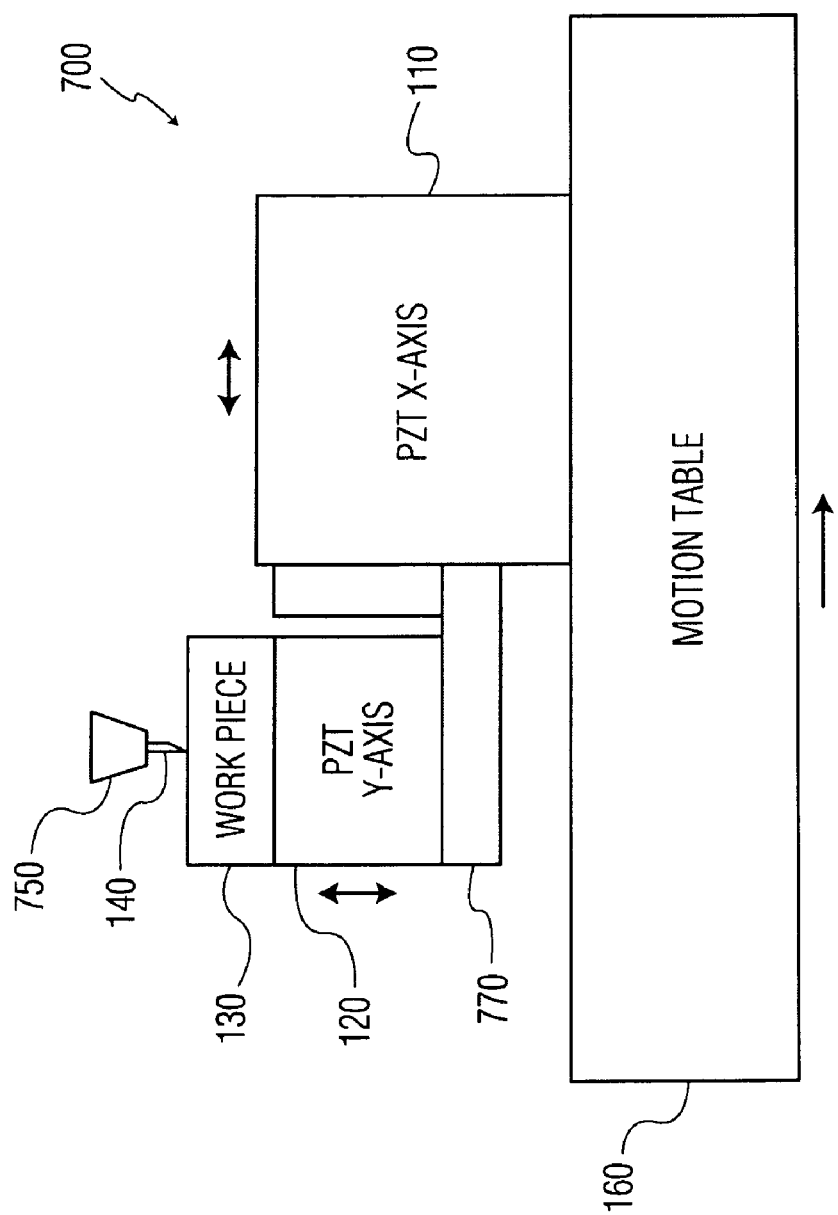
FIG. 7 is a schematic diagram illustrating a vibration machining apparatus according to yet another exemplary embodiment of the present invention.

In the exemplary embodiment of FIG. 7, exemplary vibration machining apparatus 700 is very similar to exemplary vibration machining apparatus 600, except that in exemplary vibration machining apparatus 700 vibrating unit 110 is coupled to the motion stage and cutter holding unit 750 is fixed. Thus, in the exemplary embodiment of FIG. 7, workpiece 130 both vibrates and moves with the motion table, while cutting tool 140 remains substantially stationary.

Figure 8A:
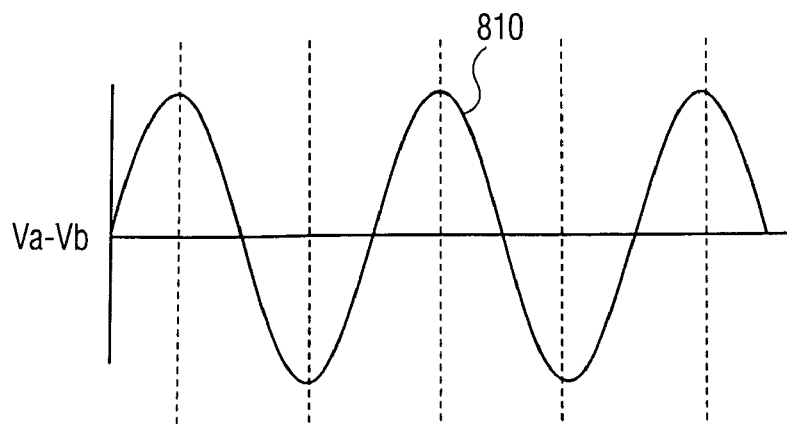
FIGS. 8A and 8B are timing diagrams illustrating input waveforms used by any one of the apparatus of FIGS. 2-7 to machine a workpiece.
Figure 8B:
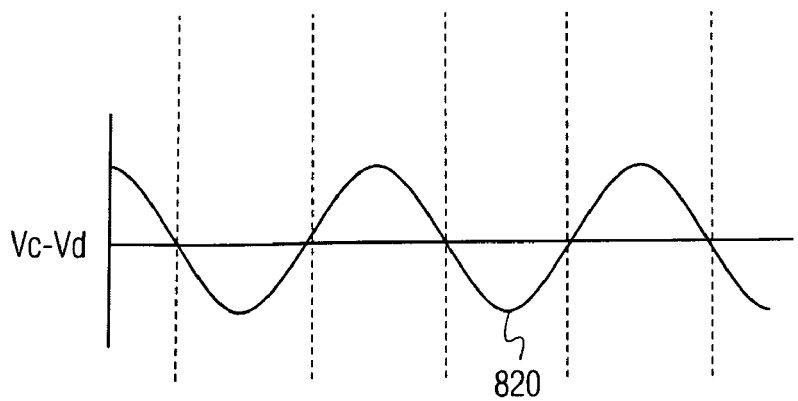
Figure 8C:
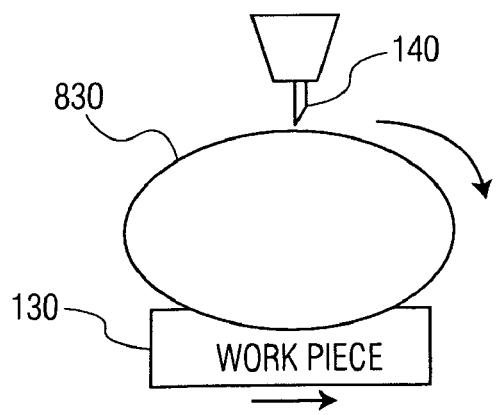
FIG. 8C is as schematic diagram illustrating a resultant motion of a cutting tool resulting from the input waveforms of FIGS. 8A and 8B.

FIGS. 8A and 8B are exemplary timing diagrams illustrating sinusoidal input waveforms 810 and 820 that may used by any one of the apparatus of FIGS. 2-7 to machine the workpiece. FIG. 8C is a schematic diagram illustrating the resulting motion of the cutting tool of an exemplary vibration machining apparatus of the present invention vibrated using exemplary input waveforms 810 and 820 of FIGS. 8A and 8B.

Referring now to FIGS. 8A-8B, an input waveform 810 that may desirably be used to drive vibrating unit 110 and input waveform 820 that may desirably be used to drive vibrating unit 120 are illustrated.

A phase angle (i.e., relative phase) between input waveform 810 and input waveform 820 is illustrated as 90°. It is contemplated, however, that the phase angle between these two input waveforms 810 and 820 may be any phase angle. It is noted that 0° and 180° may be undesirable as they lead to substantially linear vibrational motions.

Each of the input waveforms 810 and 820 are sinusoids with a common frequency. The vibration amplitude produced by vibrating unit 110 may be proportional to the peak amplitude of input voltage 810, which is the potential across input terminals Va and Vb. Moreover, the vibration amplitude produced by vibrating unit 120 may be proportional to the peak amplitude of input waveform 120, which is the potential across input terminals Vc and Vd of vibrating unit 120.

FIG. 8C illustrates the resulting motion of cutting tool 140 with vibrating units 110 and 120 being driven by input waveforms 810 and 820, respectively. With sinusoidal waveforms 810 and 820 having a 90° phase angle relative to each other substantially elliptical cutting trajectory 830 with its major axis substantially parallel to the surface of workpiece 130 may be realized by cutting tool 140. The depth (minor axis) of substantially elliptical cutting trajectory 830 is based on the peak amplitude of input waveform 820 and a length (major axis) of closed loop cutting trajectory 830 is based on the peak amplitude of input waveform 810.

The duty cycle (i.e., the ratio of the portion of cutting trajectory 830 during which cutting tool 140 is in contact with the surface of workpiece 130 to the portion of cutting trajectory 830 during which cutting tool 140 is not in contact with the workpiece 130) may be in the range of between about 10% to 50%. The duty cycle may desirably be in the range between about 10% and 30%, depending on a number of machining parameters, including: the material of workpiece 130; the material of cutting tool 140; the speed of the motion table; the vibrational frequency of the vibrating units; the depth of the cut; and the desired smoothness of the machined surface.

Motion table 160 may be provided with a direction of motion (i.e., a machining path) which extends along the major axis of cutting tool trajectory 830. Thus, by repeating the elliptical motion of closed loop cutting trajectory 830 a plurality of times while moving motion table 160, elliptical surface machining of a groove in workpiece 130 may be realized. The groove, which has a width substantially equal to the width of cutting tool 140, follows the machining path based on movement of the motion of motion table 160.

Any number of other periodic waveforms may be used to drive vibrating units 110 and 120. Each pair of periodic waveforms produces a unique closed loop trajectory for cutting tool 140. Two examples of such unique input waveforms and the resulting cutting tool trajectory are shown in FIGS. 9A-9C and FIGS. 10A-10C.

Figure 9A:
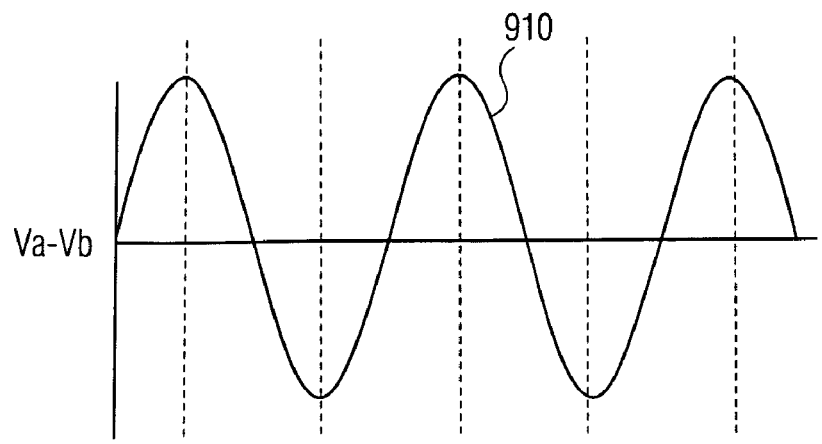
FIGS. 9A and 9B are timing diagrams illustrating another set of input waveforms used by any one of the apparatus of FIGS. 2-7 to machine the workpiece.
Figure 9B:
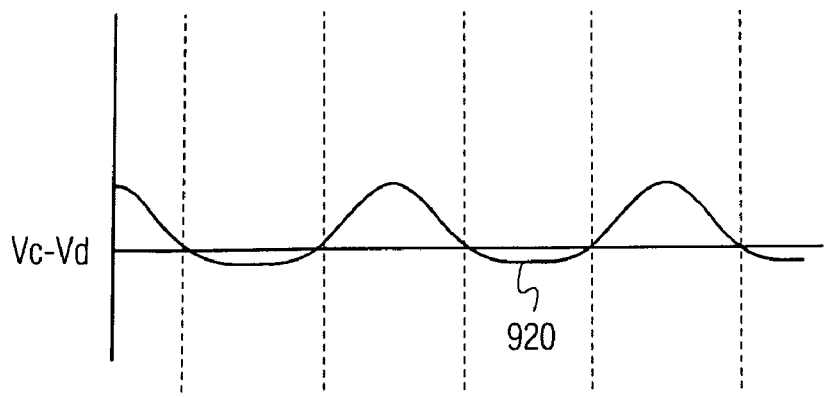

FIGS. 9A and 9B are timing diagrams illustrating another exemplary set of input waveforms that may be used by any one of the exemplary vibration machining apparatus of FIGS. 2-7 to machine the workpiece.

Figure 9C:
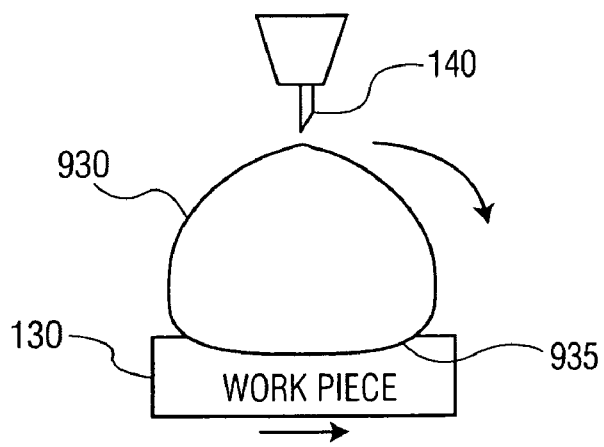
FIG. 9C is a schematic diagram illustrating a resultant motion of a cutting tool resulting from the input waveforms of FIGS. 9A and 9B.

FIG. 9C is a schematic diagram illustrating the resulting motion of the cutting tool of an exemplary vibration machining apparatus of the present invention driven by the exemplary input waveforms of FIGS. 9A and 9B.

Referring now to FIGS. 9A-9C, input waveforms 910 and 920 may be used to drive vibrating units 110 and 120, respectively. In this example, input waveform 910 is a sinusoidal waveform, however, input waveform 920 is a truncated sinusoidal waveform. That is, portions of truncated sinusoidal waveform 920 are flattened each period.

Each of input waveforms 910 and 920 has a common frequency and their relative phase angle is illustrated as 90°. It is contemplated, however, that the phase angle between input waveform 910 and input waveform 920 may be any phase angle.

A resulting motions of cutting tool 140 and workpiece 130 produce substantially closed loop cutting tool trajectory 930 which is in the shape of a flatten teardrop. Flatten teardrop shaped trajectory 930 may have certain advantages over elliptical shaped trajectory 830. For example, an improved surface smoothness of workpiece 130 and a reduced duty cycle of cutting tool 140, which reduces heating of cutting tool 140, compared to those of elliptical shaped trajectory 830 may be achieved.

Figure 10A:
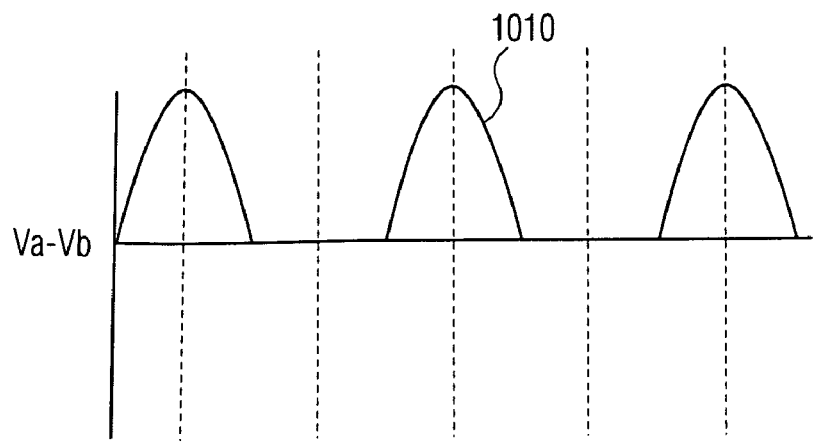
FIGS. 10A and 10B are timing diagrams illustrating yet another set of input waveforms used by any one of the apparatus of FIGS. 2-7 to machine the workpiece.
Figure 10B:
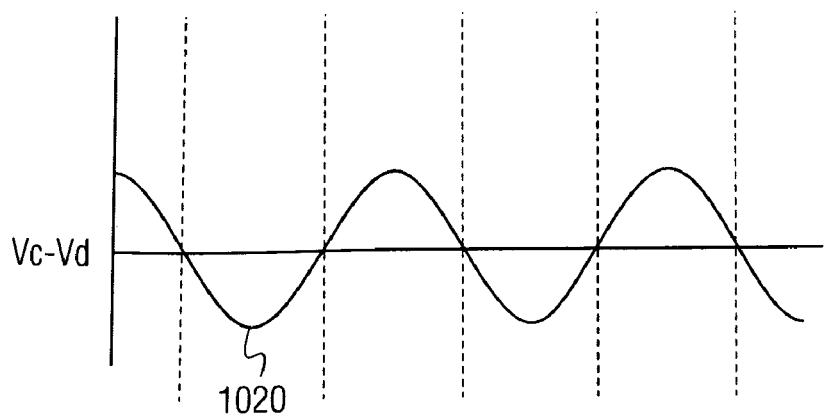

FIGS. 10A and 10B are timing diagrams illustrating yet another exemplary set of input waveforms that may be used by any one of the apparatus of FIGS. 2-7 to machine the workpiece.

Figure 10C:
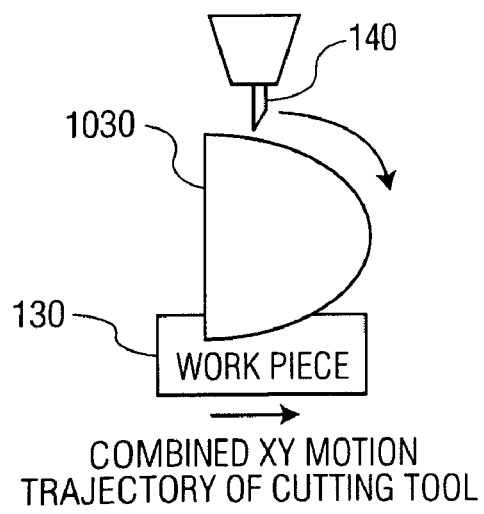
FIG. 10C is a schematic diagram illustrating a resultant motion of a cutting tool resulting from the input waveforms of FIGS. 10A and 10B.

FIG. 10C is a schematic diagram illustrating the resulting motion of the cutting tool of an exemplary vibration machining apparatus of the present invention driven by the exemplary input waveforms of FIGS. 10A and 10B.

Referring now to FIGS. 10A-10C, input waveforms 1010 and 1020 may be used to drive vibrating units 110 and 120, respectively. In this example, input waveform 1010 is a truncated sinusoidal waveform (i.e., having flat portions which are periodic), for example, a half-wave rectified waveform and input waveform 1020 is a sinusoidal waveform.

The phase angle between input waveform 1010 and input waveform 1020 is illustrated as 90°. It is contemplated, however, that the phase angle between truncated sinusoidal waveform 1010 and sinusoidal waveform 1020 may be any phase angle. Also, input waveforms 1010 and 1020 may have a common frequency.

A resulting motion of cutting tool 140 based on input waveforms 1010 and 1020 produces a substantially closed cutting tool trajectory 1030 in the shape of a truncated ellipse. Truncated ellipse shaped cutting tool trajectory 1030 may provide an advantage in that a lead-out zone may be minimized for workpiece 130. That is, by lifting cutting tool 140 steeply out of the deepening groove formed as cutting tool 140 follows the substantially closed loop cutting trajectory 1030, the lead-out zone of workpiece 130 may have a steep transition and minimum zone width. Moreover, it is contemplated that by reversing the potential across vibrating unit 110, a complementary truncated sinusoidal waveform may be used to drive vibrating unit 110 to realize a complementary truncated ellipse which may be used to produce a similar lead-out zone having a steep transition and minimum zone width.

Although it has been shown that sinusoidal waveforms and truncated sinusoidal waveforms may be used as input waveform to vibrating units 110 and 120 in various combinations, it is contemplated that other waveforms (e.g. triangular waveforms, sawtooth waveforms, stepped waveforms, and truncated non-sinusoidal waveforms such as truncated triangular waveforms) or any combination of sinusoid and non-sinusoid based waveforms may be used as long as the waveforms are periodic.

For example, the input waveform used to drive vibrating unit 110 may be provided as one of a truncated sinusoidal waveform or a sinusoidal waveform to generate vibration along the first vibrational direction and the input waveform used to drive vibrating unit 120 may be provided as one of a truncated sinusoidal waveform or a sinusoidal waveform to generate vibration along the second vibrational direction. Further, the input waveform used to drive vibrating unit 110 may be provided as one of a truncated non-sinusoidal waveform or a non-sinusoidal waveform to generate vibration along the first vibrational direction and the input waveform used to drive vibrating unit 120 may be provided as one of a truncated non-sinusoidal waveform or a non-sinusoidal waveform to generate vibration along the second vibrational direction. Moreover, the input waveform used to drive one of vibrating unit 110 or vibrating unit 120 may be a truncated sinusoidal waveform or a sinusoidal waveform and the input waveforms used to drive the other one of vibrating unit 110 and vibrating unit 120 may be a truncated non-sinusoidal waveform or a non-sinusoidal waveform.

Figure 11A:
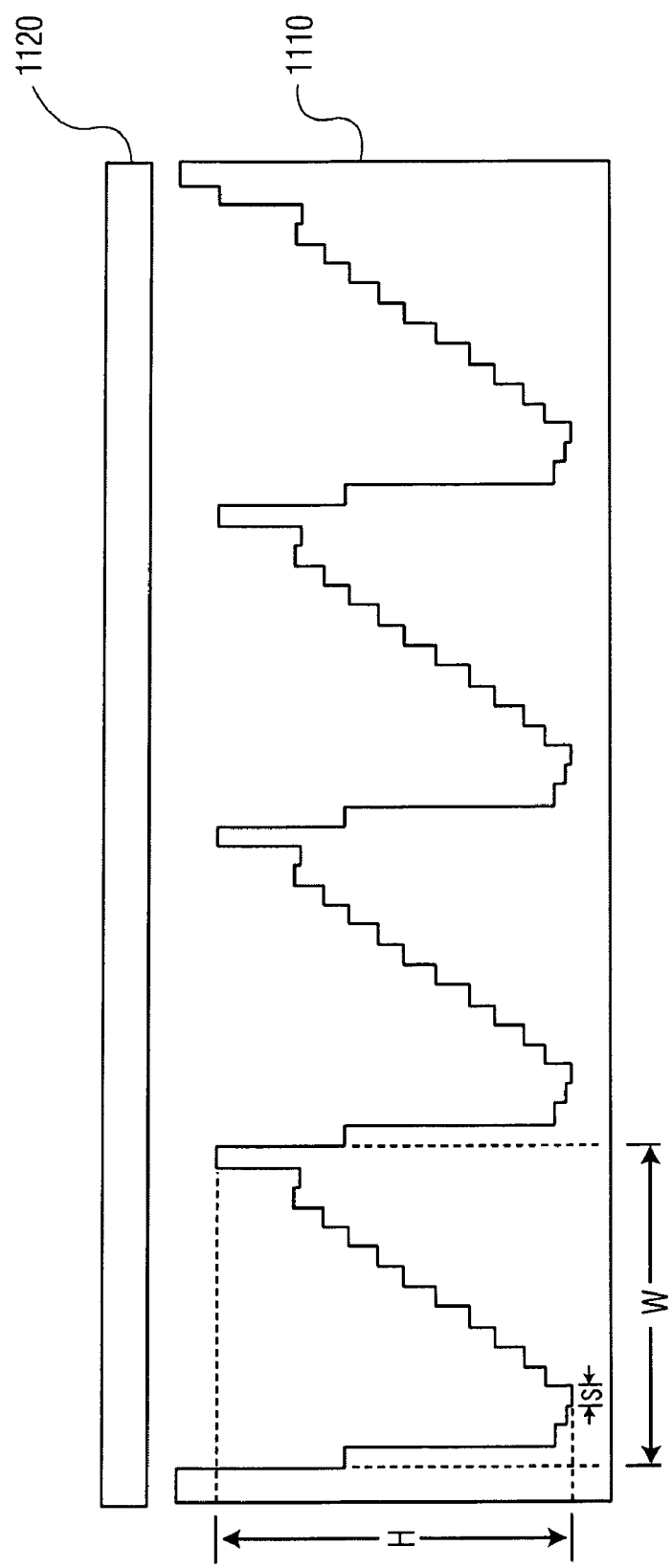
FIG. 11A is a cross-sectional view illustrating a mold used to produce a gray scale optical grating which may be machined using any one of the apparatus of FIGS. 2-7.
Figure 11B:
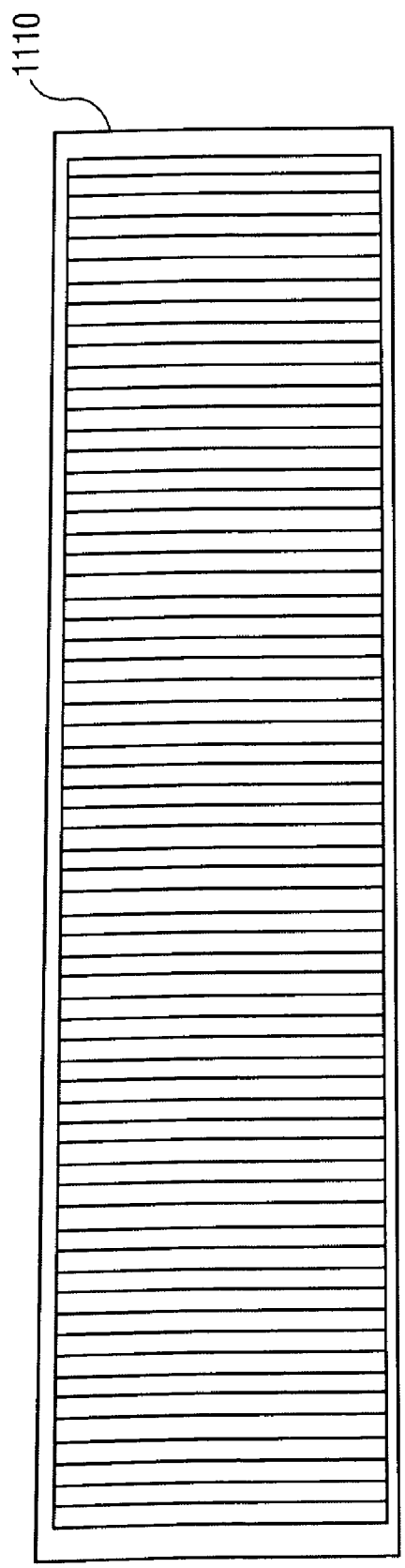
FIG. 11B is a top plan view illustrating a first mold part of FIG. 11A.

FIG. 11A is a cross-sectional view illustrating an exemplary mold used to produce a gray scale optical grating which may be machined using any one of the exemplary apparatus of FIGS. 2-7. FIG. 11B is a top plan view illustrating a first mold part in FIG. 11A.

Referring now to FIG. 11A, a vibration machine apparatus 200, 300, 400, 500 600 or 700 may be used to, for example, either directly machine an optical grayscale diffraction grating (not shown) or a mold including a first mold part 1110 and a second mold part 1120 for producing a grayscale optical diffraction grating. By stepping vibration machine apparatus 200, 300, 400, 500, 600 or 700 across the surface of first mold part 1110, either in successive linear machining paths or in successive radial machining paths (not shown in FIG. 11A), a mold 1110:1120 for producing a grayscale optical diffraction grating may be generated. The minimum width S for each grayscale step may be based on a width of the cutting tool 140 and may be in the range between about 0.1 µm to 1 µm. Further, a grayscale diffraction period W may repeat periodically and may be in the range of about 1 µm to 10 µm. Moreover, a total height H of the grayscale steps may be in the range of about 0.1 µm to 0.5 µm.

Figure 12A:
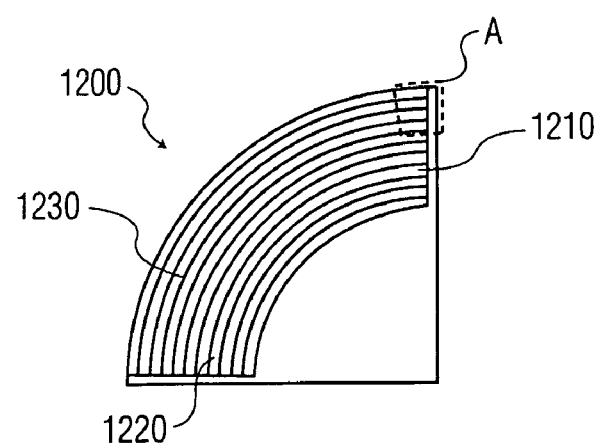
FIG. 12A is a top plan view illustrating a structure produced by any one of the apparatus of FIGS. 2-7, and shows lead-in and lead-out zones and curved grooves.

FIG. 12A is a top plan view illustrating an exemplary structure that may be produced by any one of the exemplary apparatus of FIGS. 2-7, and illustrates steep lead-in and lead-out zones and curved grooves that may be formed using an exemplary of the present invention.

Figure 12B:
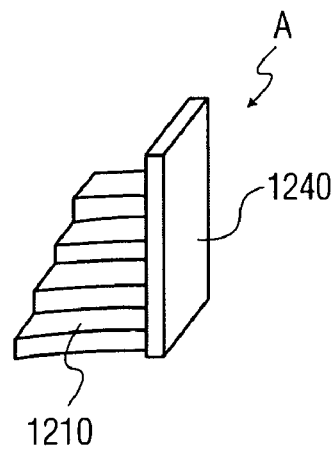
FIG. 12B is a perspective view of area A in FIG. 12A.

FIG. 12B is a perspective view illustrating area A of in FIG. 12A.

Figure 12C:
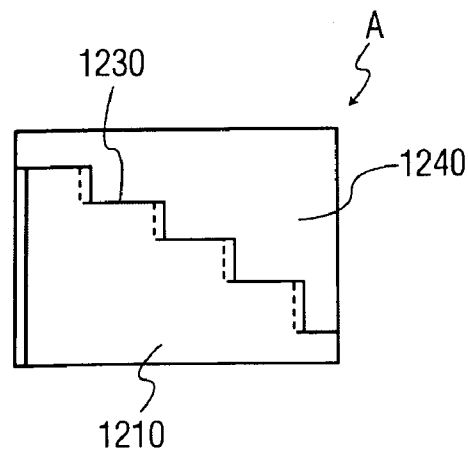
FIG. 12C is a cross-sectional view of area A in FIG. 12A.

FIG. 12C is a cross-sectional view of area A in FIG. 12A.

Referring now to FIGS. 12A-12C, vibration machining unit 200, 300, 400, 500, 600 or 700 may generate lead-in and lead-out zone with minimum transitions such as that illustrated in FIG. 12A. That is, for example, by providing input waveforms 1010 and 1020 as shown in FIGS. 10A and 10B to drive vibrating units 110 and 120, respectively, a very steep transition zone is realizable. Further, a workpiece 1200 may be machined having, for example, lead in or lead out zones 1240 with a portion of its surface 1210 having radial grooves or steps 1230. That is, first and second vibrating units 110 and 120 may be configured to produce a machined workpiece having at least portions that include radial grooves with steep transition zones. This may be accomplished by using coordinated X and Y motion of motion table 160 to follow a curved machining path, or desirably by using a motion table that includes a rotational motion stage to rotate either the workpiece or the cutting tool in the XY plane. By generating vibration in a direction substantially orthogonal to a machining path, a lead-in angle and/or a lead-out angle may be reduced or substantially eliminated.

Figure 13:
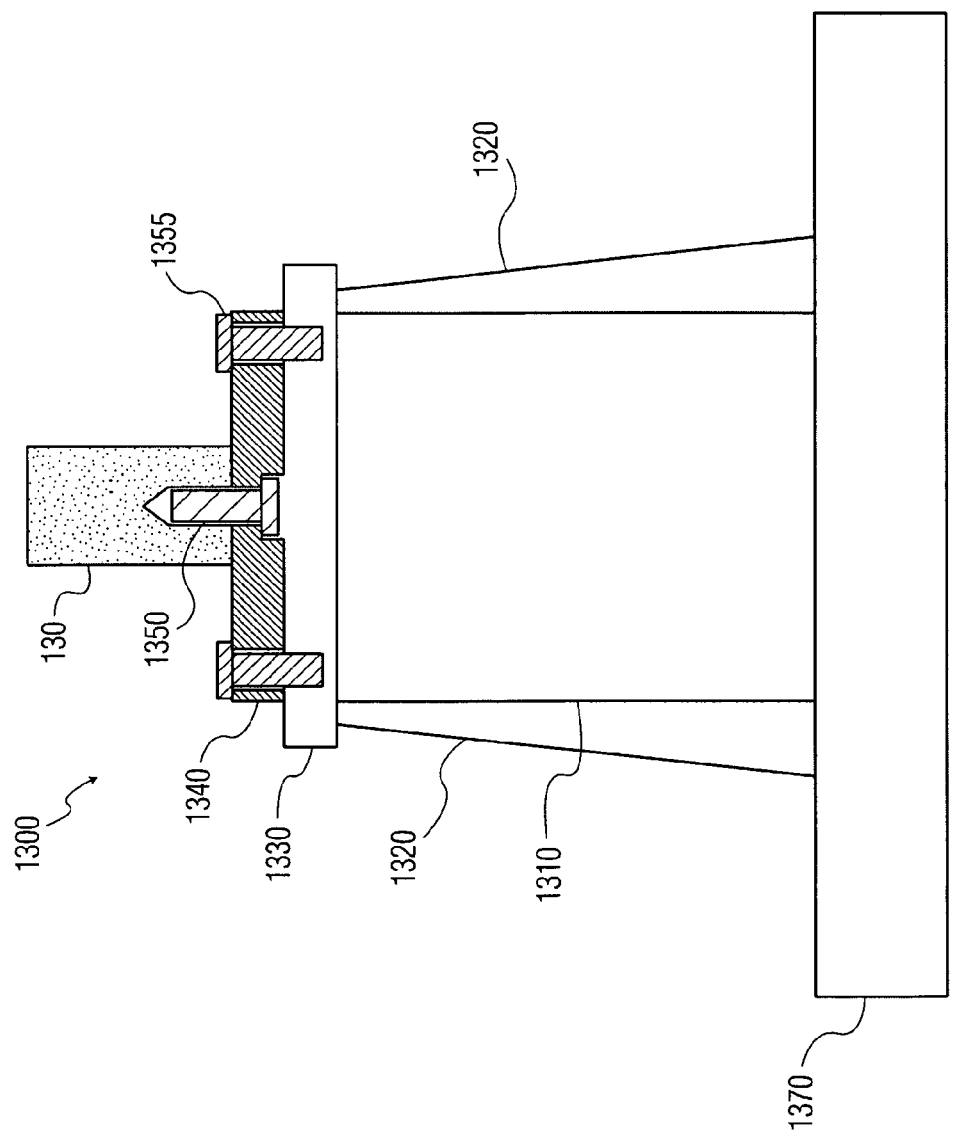
FIG. 13 is a partial cross-sectional view of a vibration machining apparatus according to yet another exemplary embodiment of the present invention.

FIG. 13 is a partial cross-sectional view of a vibration machining apparatus illustrating an exemplary workpiece mount according to yet another exemplary embodiment of the present invention.

Now referring to FIG. 13, exemplary vibration machining apparatus 1300 includes vibrating unit 1310 to vibrate workpiece 130 in a first direction. Vibrating unit 1310 may be a piezoelectric device having a piezo stack. This piezo stack may be preloaded by a plurality of preloading devices 1320 which may maintain the vibrating unit 1310 in compression. The preloading may be accomplished by providing pre-tensioned wires, as preloading devices 1320, that are under tension between a top plate 1330 of vibrating unit 1310 and a base plate 1370.

Although pre-tensioned wires are illustrated, it is noted that other preloading devices are possible. For example, spring tensioners, hydraulic tensioners, or other tensioning means may be used in exemplary embodiments of the present invention.

Top plate 1330 may be directly bonded to, for example, the piezo stack of vibrating unit 1310 and may be formed from a thin plate of steel, aluminum, alumina, or another hard material. The thickness of top plate 1330 may be in the range of 1-20 mm.

Exemplary vibration machining apparatus 1300 also includes an exemplary coupling assembly, including mounting plate 1340, mounting screws 1355, and anchor screw(s) 1350 to couple workpiece 130 to vibrating unit 1310. It is noted that this exemplary coupling assembly may include one or more anchor screws 1350 to couple workpiece 130 to mounting plate 1340. Each anchor screw may be threaded at an end to couple to workpiece 130. The exemplary coupling assembly may further include mounting screws 1355 to couple mounting plate 1340 to top plate 1330 of the vibrating unit. Each mounting screw 1355 may be threaded at an end to couple to top plate 1330 of vibrating unit 1310. Mounting plate 1340 may include recessed through holes for coupling of mounting screws 1355 and anchor screw(s) 1350 within the exemplary coupling assembly and may be formed from stainless steel, aluminum, alumina, or another hard material. The thickness of mounting plate 1340 may be in the range of 1-20 mm.

By providing this exemplary coupling assembly, the mass vibrated by exemplary vibration machining apparatus 1300 may be minimized, thus, allowing exemplary vibration machining apparatus 1300 to operate at higher frequencies without damaging vibrating unit 1310. It is contemplated that exemplary vibration machining apparatus 1300 may operate at frequencies in the range of 100 Hz to 50 KHz.

It is understood that the desired operating frequency of exemplary vibrating machining apparatus 100, 300, 400, 500, 600, 700 and 1300 may be limited by the resonance frequency relative to masses being vibrated. Thus, the various exemplary vibration machining apparatus 100, 300, 400, 500, 600 and 700, 1300 may have different maximum operating frequencies due to the various orientations of the components, which may provide different vibrational masses. For example, vibrating machining apparatus 400 and 500 may be desirable when the mass of workpiece 130 is relatively large because workpiece 130 is not vibrated by any vibrating units in these exemplary orientations, and the resulting maximum operation frequency may be higher. As another example, vibrating machining apparatus 600 and 700 may be desirable when the masses of the cutter holding unit 650 or 750 and cutting tool 140 are relatively large because cutting tool 140 is not vibrated by any vibrating units 110 and 120 in these exemplary orientations, and the resulting maximum operation frequency may be higher.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the scope of the invention.

What is claimed:

1. A vibration machining apparatus for use in machining a surface of a workpiece, comprising:
   a cutting tool to machine at least a portion of the workpiece;
   a motion stage coupled to one of the cutting tool or the workpiece to move the cutting tool relative to the workpiece coupled to the motion stage such that the cutting tool follows a machining path on the surface of the workpiece, a tangent to the machining path and a normal to the surface of the workpiece defining a vibration plane;
   a first vibrating unit coupled to one of the cutting tool or the workpiece to vibrate the one of the cutting tool or the workpiece coupled to the first vibrating unit along a first vibrational direction, the first vibrational direction being in the vibration plane or substantially in the vibration plane; and
   a second vibrating unit coupled with one of the cutting tool or the workpiece to vibrate the one of the cutting tool or the workpiece coupled to the second vibrating unit along a second vibrational direction, the second vibrational direction being different from the first vibrational direction and in the vibration plane or substantially in the vibration plane,
   wherein the first vibrating unit and the second vibrating unit are not coupled together.

2. The vibration machining apparatus according to claim 1, wherein the first vibrational direction is substantially tangent to the machining path and the second vibration direction is substantially normal to the surface of the workpiece.

3. The vibration machining apparatus according to claim 1, wherein the first vibrational direction and second vibration direction are substantially orthogonal to each other.

4. The vibration machining apparatus according to claim 1, further comprising:
   control means electrically coupled to the motion stage for controlling motion of at least one of the workpiece or the cutting tool coupled to the motion stage according to predetermined machining criteria.

5. The vibration machining apparatus according to claim 1, wherein the motion stage is configured to translate or rotate the one of the workpiece or the cutting tool coupled to the motion stage.

6. The vibration machining apparatus according to claim 1, wherein the cutting tool includes a cutting edge formed from at least one of diamond, ruby, sapphire, silicone carbide, tungsten, tungsten carbide or ceramic.

7. The vibration machining apparatus according to claim 1, wherein the first vibrating unit and the second vibrating unit each vibrate at a frequency in the range of about 100Hz to 50KHz.

8. The vibration machining apparatus according to claim 1, further comprising a signal pre-compensating unit to pre-compensate input signals to the first vibrating unit and the second vibrating unit to reduce or substantially eliminate hysteresis effects in the cutting tool.

9. The vibration machining apparatus according to claim 1, wherein the first vibrating unit and the second vibrating unit are piezoelectric stacks.

10. The vibration machining apparatus according to claim 1, wherein:
    the cutting tool includes a cutting edge for cutting the surface of the workpiece; and
    the first vibrating unit and the second vibrating unit are configured to generate a composite trajectory of the cutting edge relative to the workpiece which is substantially closed looped.

11. The vibration machining apparatus according to claim 10, wherein at least a portion of the closed loop trajectory is elliptical.

12. A method of machining at least a portion of a workpiece using vibration machining apparatus, the method comprising the steps of:
    a) moving a cutting tool relative to the workpiece such that the cutting tool follows a machining path on the surface of the workpiece, a tangent to the machine path and a normal to the surface of the workpiece defining a vibration plane;
    b) vibrating one of the cutting tool or the workpiece coupled to a first vibrating unit along a first vibrational direction, the first vibrational direction being in the vibration plane or substantially in the vibration plane; and
    c) vibrating one of the cutting tool or the workpiece coupled to the second vibrating unit along a second vibrational direction, the second vibrational direction being different from the first vibrational direction and in the vibration plane or substantially in the vibration planes,
    wherein the first vibrating unit and the second vibrating unit are not coupled together.

13. The method according to claim 12, further comprising the step of:
    d) independently controlling (1) amplitudes of input waveforms of the first vibrating unit and the second vibrating unit, (2) a relative phase of the input waveforms of the first vibrating unit and the second vibrating unit or (3) the input waveforms of the first vibrating unit and the second vibrating unit.

14. The method according to claim 13, wherein input waveforms of the first vibrating unit and the second vibrating unit are periodic.

15. The method according to claim 12, wherein steps (b) and (c) of vibrating by the first vibrating unit and the second vibrating unit, each comprise the step of generating a vibration at a frequency in a range of about 100Hz to 50KHz.

16. The method according to claim 13, wherein step (d) of independently controlling the relative phase of the input waveforms includes the step of controlling the relative phase of the input waveform to have a relative phase other than a relative phase of 0° or 180°.

17. The method according to claim 12, further comprising the step of:
    e) pre-compensate input waveforms of the first vibrating unit and the second vibrating unit to reduce or substantially eliminate hysteresis effects in the cutting tool.

18. The method according to claim 12, wherein steps (b) and (c) of vibrating by the first vibrating unit and the second vibrating unit further comprises the step of generating a composite trajectory of a cutting edge of the cutting tool relative to the workpiece which is substantially closed looped.

19. The method according to claim 13, wherein step (d) of independently controlling further comprises the steps of:
    providing one of a truncated sinusoidal waveform or a sinusoidal waveform, as the input waveform of the first vibrating unit, to generate vibration along the first vibrational axis; and
    providing one of a truncated sinusoidal waveform or a sinusoidal waveform, as the input waveform of the second vibrating unit, to generate vibration along the second vibrational axis.

20. The method according to claim 14, wherein step (d) of independently controlling further comprises the steps of:

providing one of a truncated non-sinusoidal waveform or a non-sinusoidal waveform, as the input waveform of the first vibrating unit, to generate vibration along the first vibrational axis; and providing one of a truncated non-sinusoidal waveform or a non-sinusoidal waveform, as the input waveform of the second vibrating unit, to generate vibration along the second vibrational axis.

21. The method according to claim 14, wherein one of the input waveforms of the first vibrating unit or the second vibrating unit is a truncated sinusoidal waveform or a sinusoidal waveform and a remaining one of the input waveforms of the first vibrating unit and the second vibrating unit is a truncated non-sinusoidal waveform or a non-sinusoidal waveform.

22. The method according to claim 12, further comprising the step of:

f) controlling motion of one of the workpiece or the cutting tool coupled to the motion stage according to predetermined machining criteria.

23. The method according to claim 12, wherein step (a) comprises the step of:

translating and/or rotating the one of the workpiece or the cutting tool coupled to the motion stage.

24. The method according to claim 20, wherein the input waveforms of the first vibrating unit and the second vibrating unit have a relative phase of 90° and a common frequency.

* * * * *